United States Patent [19]
Omata et al.

[11] Patent Number: 5,715,483
[45] Date of Patent: Feb. 3, 1998

[54] AUTOMATIC FOCUSING APPARATUS AND METHOD

[75] Inventors: Kyoichi Omata, Tanashi; Manabu Kiri, Machida; Eiichi Shimizu, Yokahama, all of Japan

[73] Assignee: Eastman Kodak Company, Rochester, N.Y.

[21] Appl. No.: 729,467

[22] Filed: Oct. 11, 1996

[30] Foreign Application Priority Data

Mar. 5, 1996 [JP] Japan ................................. 8-047066

[51] Int. Cl.$^6$ .............................................. G03B 13/36
[52] U.S. Cl. ...................... 396/80; 396/91; 396/101; 396/127; 396/133
[58] Field of Search ........................ 396/101, 125, 396/126, 127, 116, 117, 79–82, 93, 133, 91; 348/354, 355, 356, 347; 250/201.2, 201.3, 201.7

[56] References Cited

U.S. PATENT DOCUMENTS

| | | | |
|---|---|---|---|
| 4,510,384 | 4/1985 | Grimbleby et al. | 396/116 |
| 4,681,419 | 7/1987 | Sakai et al. | 396/133 X |
| 4,853,788 | 8/1989 | Murashima et al. | 348/356 |
| 5,249,058 | 9/1993 | Murata et al. | 348/354 |

Primary Examiner—W. B. Perkey
Attorney, Agent, or Firm—David M. Woods

[57] ABSTRACT

An automatic focusing apparatus moves a focusing lens once over a full movement range from the nearest point or from the infinite point so as to cause a photoelectric detector to output an electrical signal at predetermined stepwise lens positions. A lens position range can be specified based on the output electrical signal. The lens position range contains a lens position allowing the maximum focus evaluation value. A lens position for the maximum evaluation value is searched within the lens position range. A reliable and fast focusing operation can be obtained for finding out the maximum focus evaluation value without the effect of a local extremum in the focus evaluation value.

6 Claims, 8 Drawing Sheets

AUTOMATIC FOCUSING APPARATUS AND METHOD

FIELD OF THE INVENTION

The present invention relates to an automatic focusing apparatus and method in imaging devices such as electronic still cameras, and more specifically, to the apparatus comprising a photoelectric detector for converting an image formed by a focusing lens into an electrical signal corresponding to the illuminance of the image and a focusing means for calculating a focus evaluation value representative of the amount of high frequency component contained in the electrical signal and for focusing the image by moving the focusing lens in accordance with the focus evaluation value.

BACKGROUND OF THE INVENTION

Conventional video cameras have employed a so-called "hill climbing servo" focusing mechanism. A mechanism of this type utilizes the fact that an electrical signal from the photoelectric detector, such as a CCD (charge coupled device), includes a larger amount of high frequency component for an in- focus image than for an out-of-focus image. The hill climbing servo mechanism determines the in-focus condition of the image at the maximum amount of high frequency component.

The search of a lens position causing the maximum amount of high frequency component can be conducted by moving the focusing lens in one direction from the nearest point or the infinite point. A focus evaluation value is sequentially calculated during the movement of the focusing lens. The focus evaluation value is representative of an amount of the high frequency component within a focus evaluation area defined in a part of the image screen. The focusing lens is kept moving as the focus evaluation value increases. A fall in the focus evaluation value can be determined as a pass beyond the maximum value. The focusing lens is then positioned to allow the maximum focus evaluation value.

Figure 11:
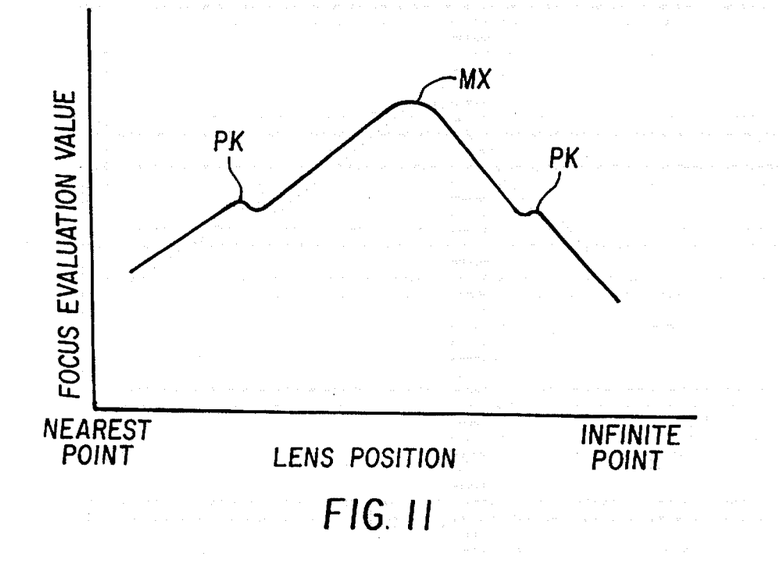
FIG. 11 is a graph illustrating the variation in focus evaluation value for movement of a focusing lens.

The conventional hill climbing servo mechanism determines, as mentioned above, the maximum focus evaluation value by searching for a fall in the focus evaluation value. The mechanism accordingly takes a local extremum PK for the maximum value MX, as shown in FIG. 11, when the mechanism detects the local extremum PK before reaching the maximum value MX.

Such an erroneous detection of a local extremum PK can possibly be prevented by reducing the sensitivity in detecting a fall of the focus evaluation value, for example, by establishing a certain threshold. The movement of the focusing lens can be terminated when the movement distance of the focusing lens exceeds such a certain threshold after detection of a fall or when the decreased amount of the value exceeds such a certain threshold. However, the reduced sensitivity may lead to a slow automatic focusing.

SUMMARY OF THE INVENTION

Accordingly, an object of the present invention is to provide an automatic focusing apparatus and method capable of performing a fast and reliable focusing operation while preventing a focusing lens from stopping at a lens position for any local extremum in the focusing evaluation value.

According to a first aspect of the present invention, there is provided an automatic focusing device comprising: a photoelectric detector capable of converting an image formed thereon through a focusing lens into an electrical signal corresponding to an illuminance of the image; and a focusing means capable of calculating a focus evaluation value representative of an amount of high frequency component contained in the electrical signal and of focusing the image by moving the focusing lens in accordance with the focus evaluation value. The focusing means includes a lens driver mechanism capable of moving the focusing lens over a full movement range from a nearest point or an infinite point and a detector driver capable of causing the photoelectric detector to output the electrical signal at stepwise lens positions during movement of the focusing lens over the full movement range. On the basis of the electrical signal from the photoelectric detector, the focusing means specifies a lens position range which includes a lens position allowing the maximum focus evaluation value.

With the above arrangement, since the focusing lens can be moved once over a full movement range so as to first conduct a rough focusing operation, it is possible to reliably prevent a local extremum from being erroneously taken for the maximum focus evaluation value.

The focusing means may further comprise: a digital filter capable of changing a pass band in response to a change of a filter coefficient; and a controller capable of setting the filter coefficient. The controller may set the filter coefficient to establish a wide-pass filter by using the digital filter when the focusing lens moves over the full movement range from the nearest position or infinite position. The controller may also set the filter coefficient to establish a high-pass filter by using the digital filter when the focusing lens moves within the lens position range following the movement over the full movement range. The digital filter can easily be adapted to the type of focusing operation.

Also, the controller may set the filter coefficient to establish a low-pass filter instead of the aforementioned high-pass filter by using the digital filter when either the maximum value or a difference between the maximum and minimum values of the focusing evaluation value is smaller than a predetermined threshold during the movement of the focusing lens within the lens position range. The employment of a low-pass filter leads to a fine focusing operation even when an object has a low contrast.

In addition, the focusing means may further comprise: depth-of-field detecting means capable of detecting a depth of field at least in accordance with a focal length or a lens stop and step width determining means capable of changing in response to a detected depth of field an interval between lens positions within the lens position range.

According to a second aspect of the present invention, there is provided a method of automatic focusing, comprising: forming an image on a photoelectric detector through a focusing lens so as to cause the photoelectric detector to output an electrical signal corresponding to an illuminance of the image; calculating a focus evaluation value representative of an amount of high frequency component contained in said electrical signal; and searching a lens position allowing a maximum focus evaluation value so as to move said focusing lens to the lens position. The method further comprises: moving said focusing lens at least once over a full movement range from a nearest position or an infinite position so as to cause the photoelectric detector to output the electrical signal at stepwise lens positions during movement of said focusing lens over the full movement range; specifying on the basis of said electrical signal a lens position range including a lens position allowing the maximum focus evaluation values; and searching the maximum focus evaluation value within said lens position range.

BRIEF DESCRIPTION OF THE DRAWINGS

The above and other objects, features and advantages will be apparent from the following detailed description taken in conjunction with the accompanying drawings, wherein.

DESCRIPTION OF THE PREFERRED EMBODIMENTS

Figure 1:
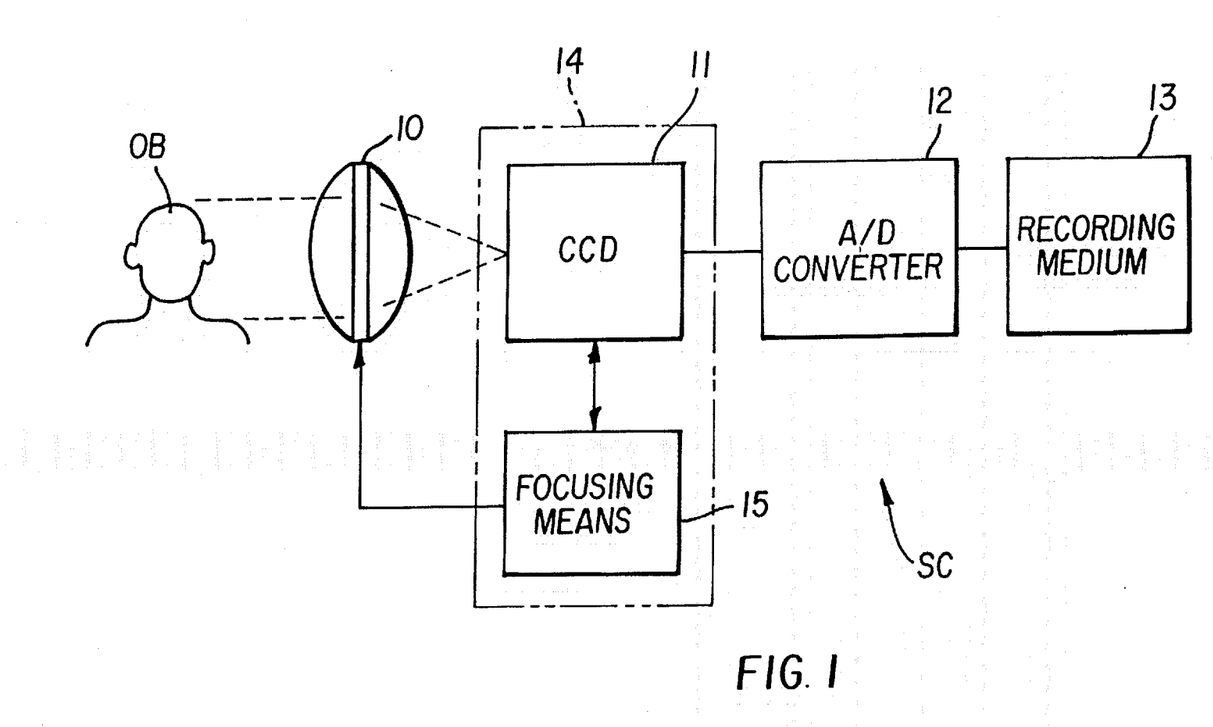
FIG. 1 illustrates an overall structure of an electronic still camera employing an automatic focusing apparatus according to the present invention.

FIG. 1 illustrates an overall structure of an electronic still camera employing an automatic focusing apparatus according to the present invention. An electronic still camera SC includes a focusing lens 10 for capturing an image of an object OB at an appropriate lens position and a CCD 11 serving as a photoelectric detector which converts the image formed thereon through the focusing lens 10 into an electrical signal corresponding to the illuminance of the image. The image captured by the CCD 11 is converted into a digital signal, e.g., by an A/D converter 12, and then stored in a recording medium 13 such as a memory card.

An automatic focusing apparatus 14 comprises the aforementioned CCD 11 and a focusing means 15 for moving the focusing lens 10 so as to focus the image. As is apparent from FIG. 2, the focusing means 15 includes a CCD driver 16 serving as a detector driver for supplying a drive signal to the CCD 11, a lens driver mechanism 17 for moving the focusing lens 10 back and forth along the optical axis of the lens 10, and a controller 18 for controlling the CCD driver 16 and the lens driver mechanism 17. The CCD 11 outputs, under the control by the controller 18, a serial signal sequence, that is, a current having a magnitude corresponding to the illuminance of each pixel in the image. A focus evaluator 20 receives the signal sequence from the CCD 11 through a signal processing means 19. The focus evaluator 20 calculates a focus evaluation value representative of an amount of high frequency component contained in the signal sequence. The controller 18 moves the focusing lens 10 to a lens position allowing the maximum focus evaluation value under the control of the CCD driver 16 and the lens driver mechanism 17.

Figure 2:
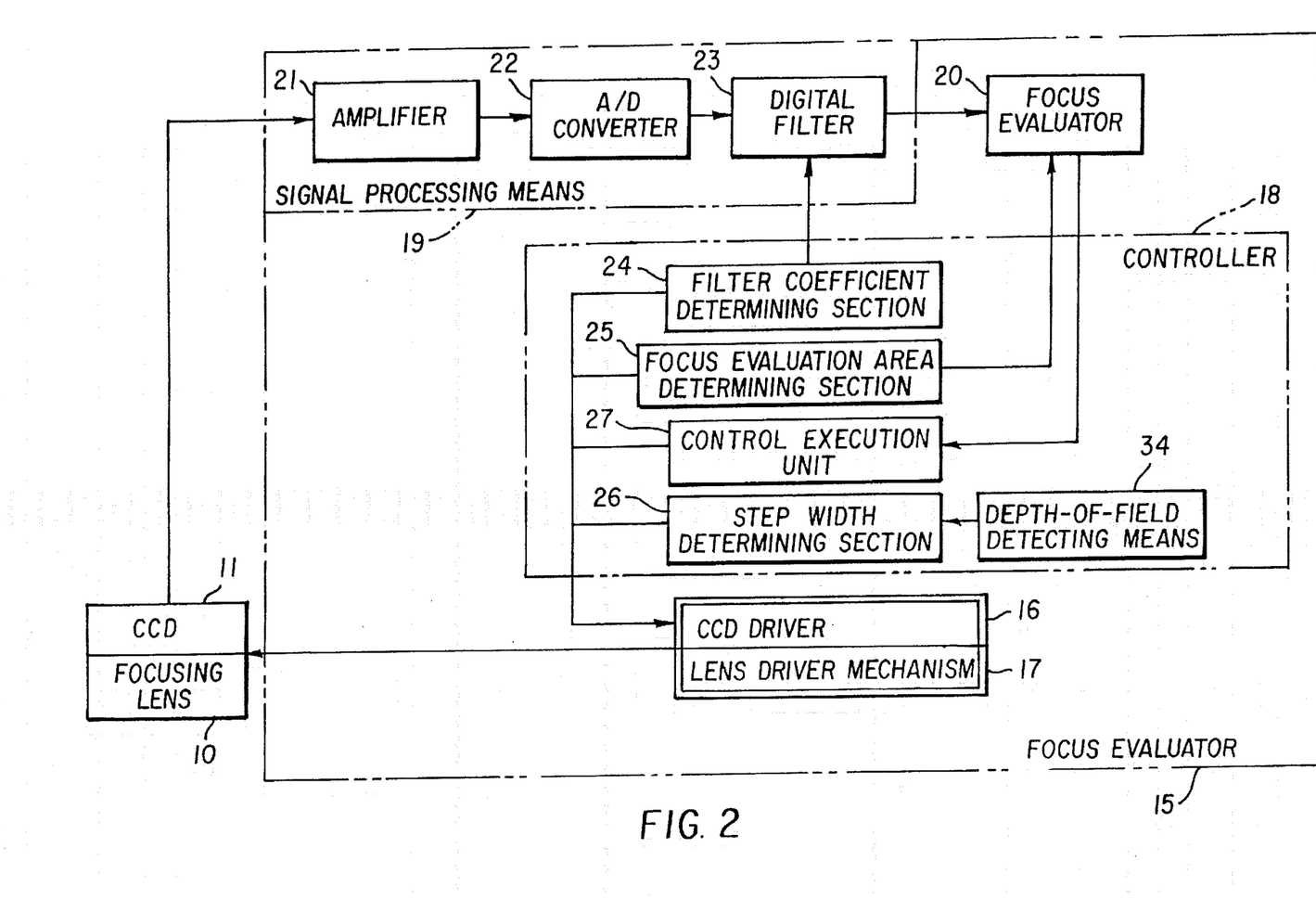
FIG. 2 is a block diagram illustrating a circuit structure of a focusing means.

The signal processing means 19 includes an amplifier 21 for amplifying the electrical signal from the CCD 11, and an A/D converter 22 for linearly converting the amplified signal into a digital signal. The signal processing means 19 further includes a digital filter 23 for allowing the most appropriate electrical signal to be passed out of the digital signals supplied from the A/D converter 22 in accordance with the operating mode of the automatic focusing device 14. The A/D converter 22 ensures the linearity of the output digital signal in correspondence with the incident light to the CCD 11. The focus evaluator 20 sums the digital values for respective pixels over a predetermined focus evaluation area. The sum of the digital values serves as the focus evaluation value.

The controller 18 includes a filter coefficient determining section 24 for determining a filter coefficient of the digital filter 23, and a focus evaluation area determining section 25 for defining the focus evaluation area in a part of the image screen. The controller 18 further includes a step width determining section 26 for changing, in response to the operation of the lens driver mechanism 17, a step width, which is an interval between lens positions occupied by the focusing lens 10. A control execution unit 27 controls the operation of the filter coefficient determining section 24, the focus evaluation area determining section 25 and the step width determining section 26 in accordance with the focus evaluation value applied from the focus evaluator 20.

Figure 3:
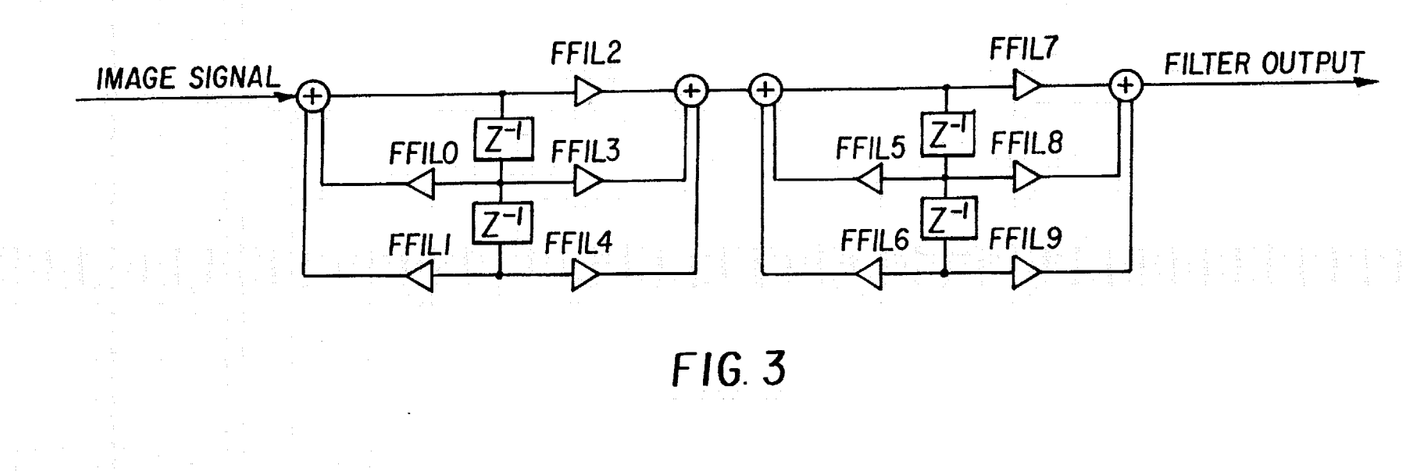
FIG. 3 illustrates an overall structure of an example of a digital filter.
Figure 4A:
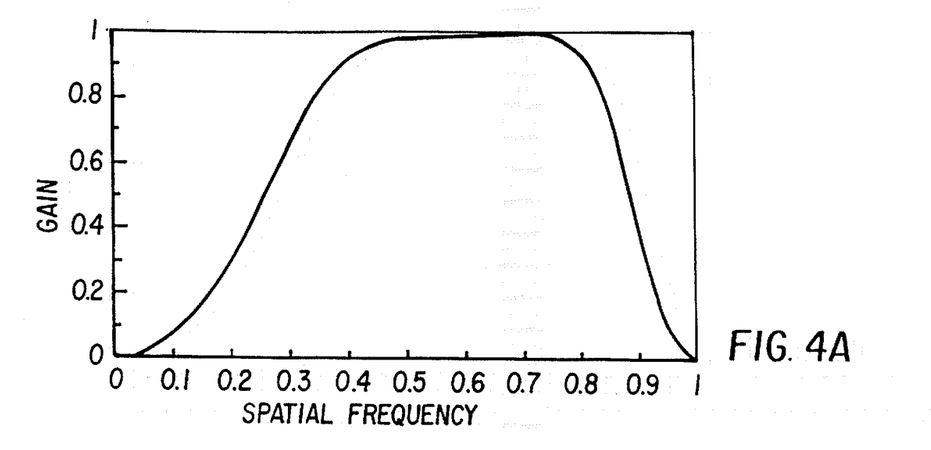
FIGS. 4A to 4C illustrate three types of frequency characteristics of a digital filter.
Figure 4B:
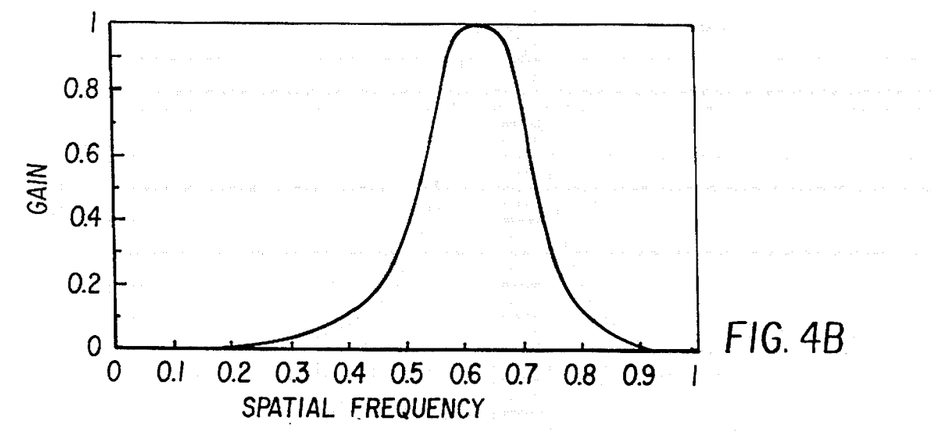
Figure 4C:
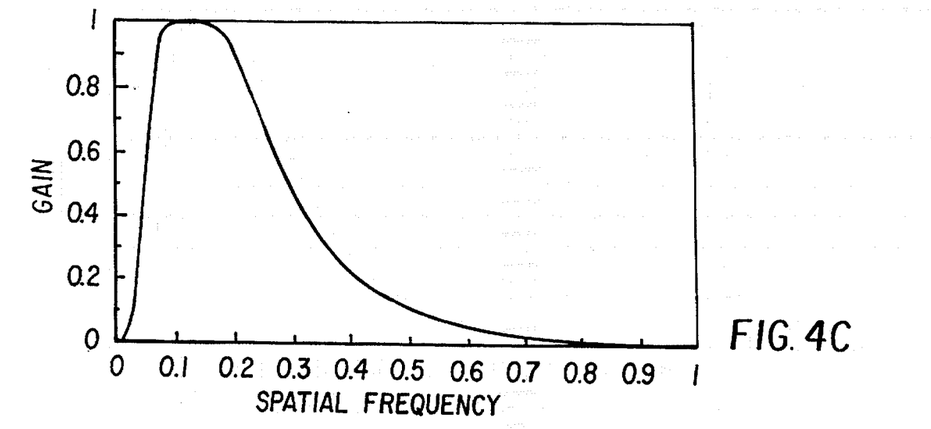

The filter coefficient determining section 24 sets the filter coefficient of the digital filter 23 so as to alter a characteristic, i.e., a pass band of the filter 23. For example, assume that the digital filter 23 comprises two secondary IIR (infinite impulse response) systems which are cascaded as shown in FIG. 3. Selection of the coefficients of multipliers FFIL0–FFOL9 may allow the digital filter 23 to operate as a wide-pass filter with a frequency characteristic as shown in FIG. 4A, a high-pass filter with a frequency characteristic as shown in FIG. 4B, or a low-pass filter with a frequency characteristic as shown in FIG. 4C. The filter coefficient determining section 24 may include a table containing preset filter coefficients required to obtain a desired frequency characteristic.

Figure 5:
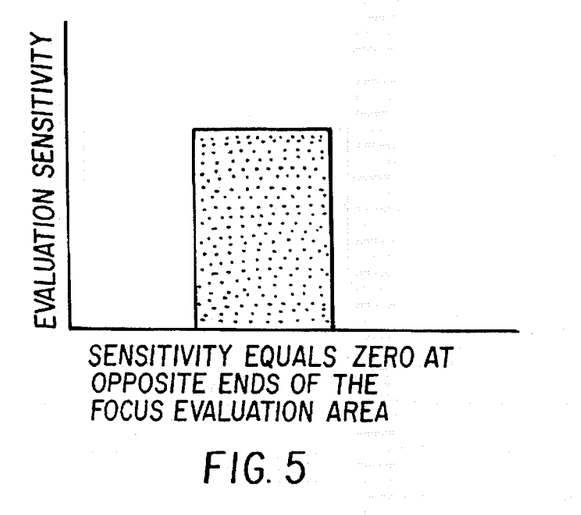
FIG. 5 illustrates a diagram for a standard sensitivity of the focus evaluation area.
Figure 6A:
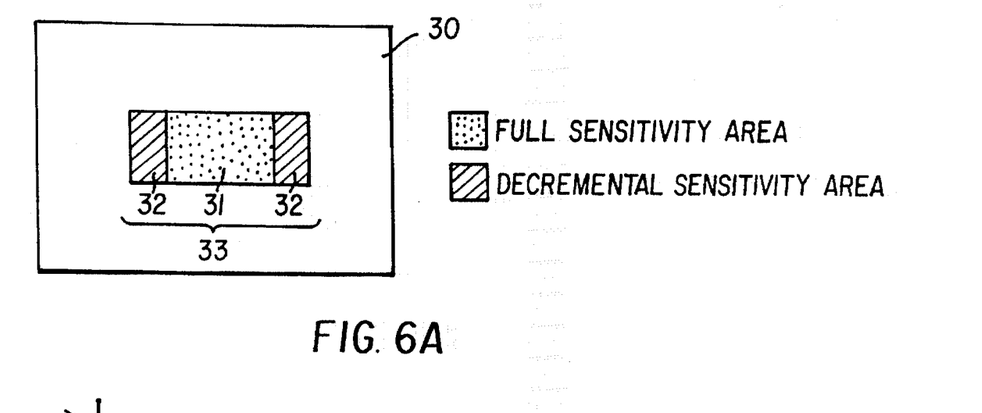
FIGS. 6A to 6C illustrate a diagram for setup of a decremental sensitivity for the focus evaluation area.
Figure 6B:
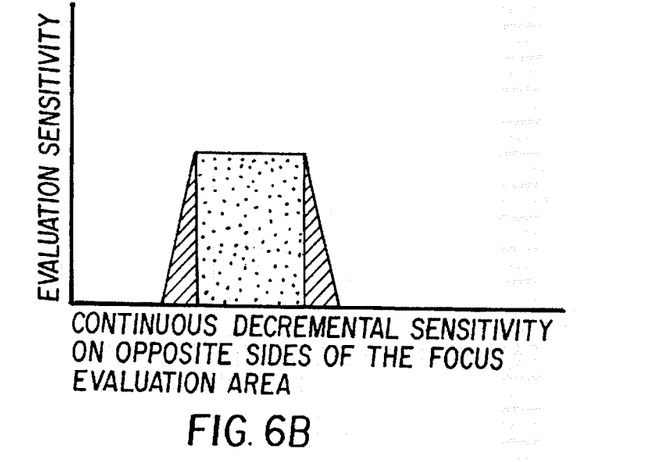
Figure 6C:
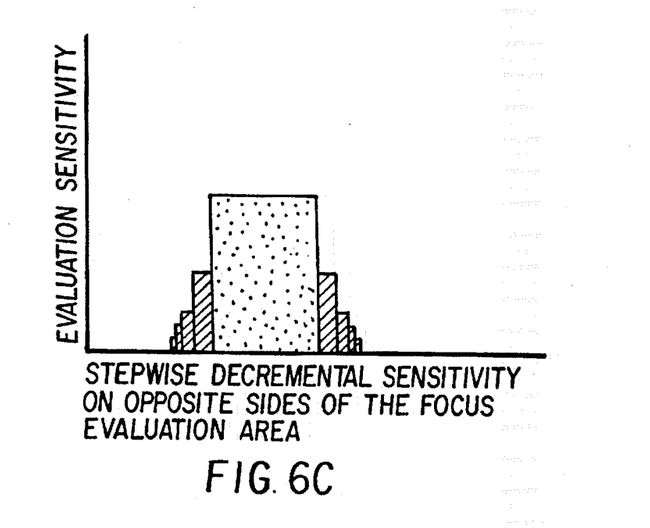

The focus evaluation area determining section 25 causes the focus evaluator 20 to select the signal sequence signals for pixels included in the focus evaluation area. The focus evaluation area can be set as a standard area as shown in FIG. 5. It is also possible to divide a focus evaluation area 33 into a full sensitivity area 31 at the center of the screen 30 and decremental sensitivity areas 32 on either sides of the full sensitivity area 31 as shown in FIG. 6A. This type of division contributes to suppressing of the effect from shake caused by the unstable holding by an operator. The division may be achieved by a clock counter for pixels, for example. When the CCD 11 outputs signal sequence for pixels in a horizontal direction, the clock counter counts clocks for additional pixels corresponding to a width of the decremental sensitivity area. For example, the sensitivity in the additional clocks may be linearly increased at the beginning of the counting and linearly decreased at the end of the counting, as shown in FIG. 6B. Alternatively, the sensitivity in the additional clocks may be stepwise increased at the beginning of the counting and stepwise decreased at the end of the counting, as shown in FIG. 6C. The adjustment of sensitivity is achieved by multiplying a digital value for each pixel by a coefficient less than 1. The adjustment may be performed on the output of the digital filter 23 prior to input to the focus evaluator 20.

The step width determining section 26 determines the step width for positioning the focusing lens 10 on the basis of a depth of field detected by depth-of-field detecting means 34. The depth-of-field detecting means 34 detects a depth of field based on focal length and lens stop of the focusing lens 10. The detection of the depth-of-field may utilize, for example, a focal length previously set corresponding to lens positions, a lens stop previously set depending on the luminance of the image, and so on.

Figure 7:
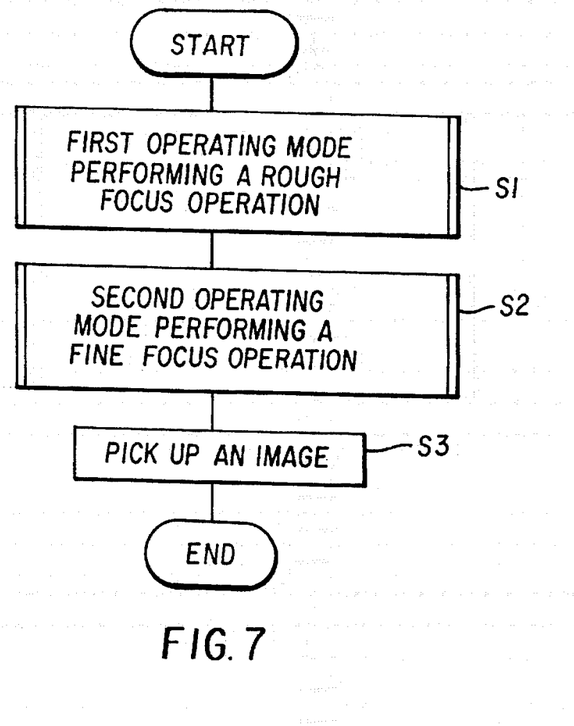
FIG. 7 is a flow chart illustrating the operation of an automatic focusing method according to the present invention.
Figure 8A:
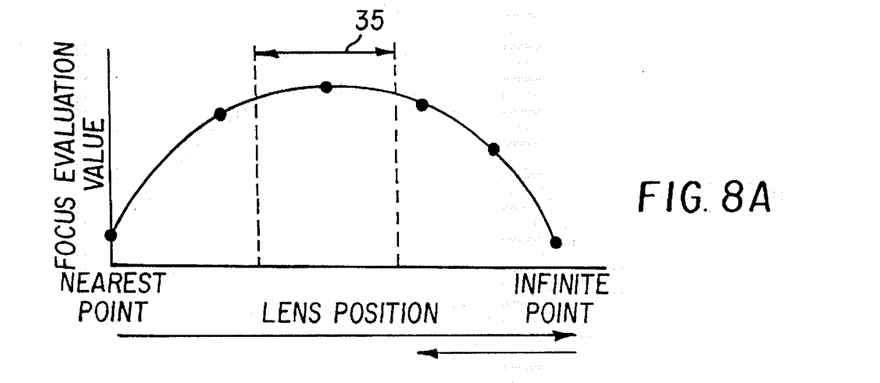
FIG. 8A illustrates an extent for movement of the focusing lens in the first operating mode.
Figure 8B:
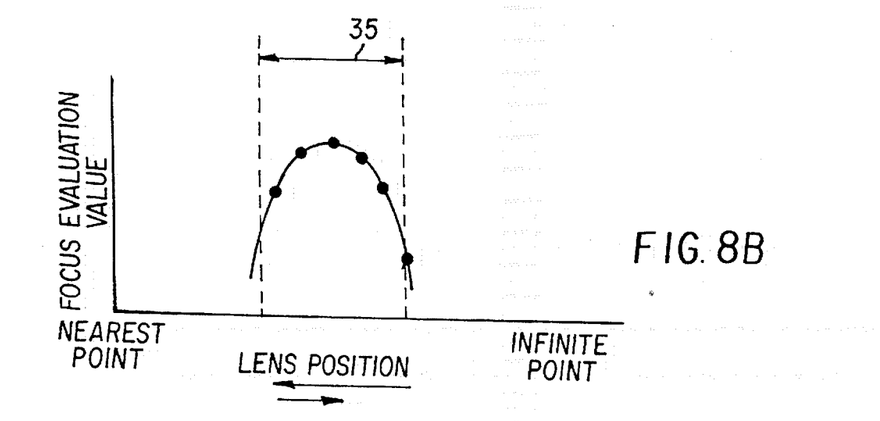
FIG. 8B illustrates an extent for movement of the focusing lens in the second operating mode.

FIG. 7 illustrates a flowchart for specifying the operation of the automatic focusing apparatus according to the present embodiment. The control execution unit 27 in the controller 18 supervises the operation. The control execution unit 27 sets in the first step S1 a first operating mode for performing a rough focusing operation. The first operating mode specifies a lens position range 35 of a predetermined width on the basis of the electrical signal output from the CCD 11 as shown in FIG. 8A. The lens position range 35 contains a lens position allowing the maximum focus evaluation value. The control execution unit 27 then sets in the second step S2 a second operating mode for performing a fine focusing operation. The second operating mode specifies, at a substantial pinpoint, a lens position allowing the maximum focusing evaluation value within the lens position range 35 specified in the first operating mode as shown in FIG. 8B. The focusing lens 10 is positioned at the third step S3 at the lens position for the maximum focus evaluating value. The image is then picked up. The resulting image is accurately focused.

Figure 9:
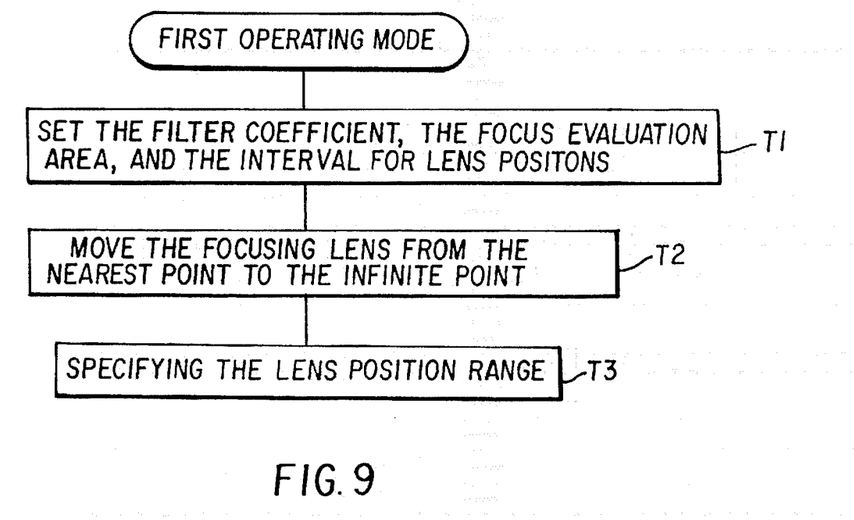
FIG. 9 is a flow chart illustrating the operation of the first operating mode.

FIG. 9 illustrates a flowchart for specifying details of the first operating mode. The control of the control execution unit 23 serves to set in the first step T1 the filter coefficient of the digital filter 23, the focus evaluation area of the focus evaluator 20, and interval between lens positions for calculating focus evaluation values. The filter coefficient is designed to establish a wide-pass filter by using the digital filter 23 as shown in FIG. 4A. The employment of a wide-pass filter enables a sufficient variation in output responsive to the distance from an object of a low contrast. The focus evaluation area is drawn on a finder, not shown, of the camera body, so that an operator can notice the position of the area. The intervals between lens positions are useful for determining the lens positions at which the CCD 11 outputs electrical signals and calculates focus evaluation values. The first operating mode allows an interval of relatively wide step.

The focusing lens 10 is moved in the second step T2 under the control of the control execution unit 27 at a constant velocity along its optical axis from the nearest point to the infinite point. During the movement of the focusing lens 10, CCD driver 16 causes the CCD 11 to output electrical signals at the preset intervals. The focus evaluator 20 calculates a focus evaluation value based on a digital signal each time the electrical signal is output. The control execution unit 27 compares in the third step T3 all focus evaluation values to thereby specify a lens position range 35 which contains a lens position allowing the maximum focusing evaluation value. A width of the lens position range 35, i.e., a distance which the focusing lens 10 traces in the second operating mode can be set depending on the time required for the focusing operation. It is preferable to expand the lens position range 35 equally on opposite sides of the lens position for the maximum focus evaluation value.

Figure 10:
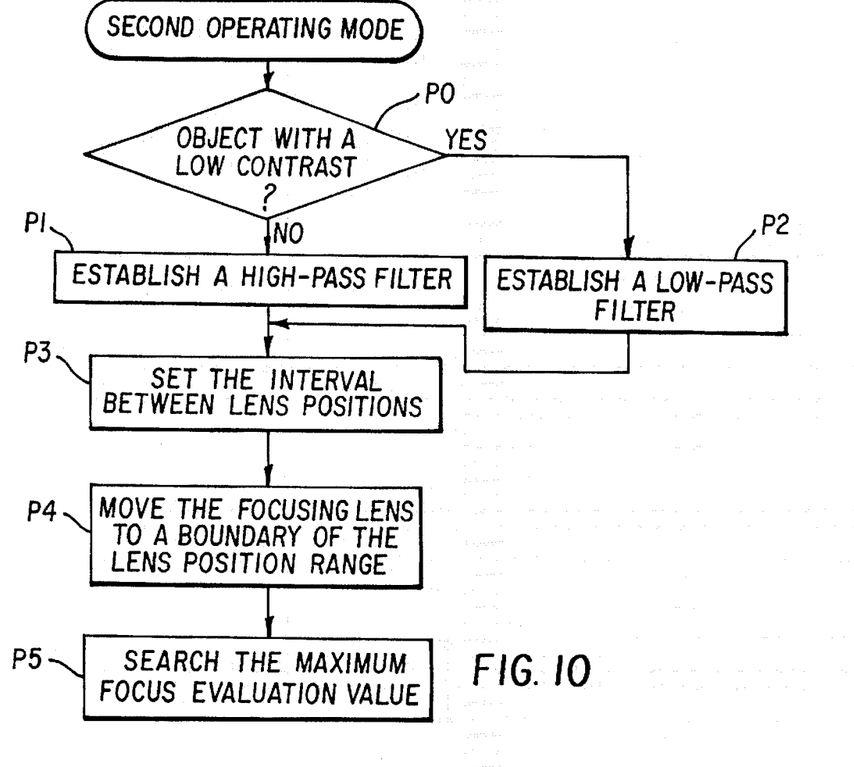
FIG. 10 is a flow chart illustrating the operation of the second operating mode.

FIG. 10 illustrates a flowchart for specifying details of the second operating mode. The control execution unit 27 changes in the first step P1 the filter coefficient to establish a high-pass filter by using the digital filter 23 as shown in FIG. 4B. The employment of a high-pass filter enables an efficient processing of high frequency component. However, the determination of a low contrast for an object at the preliminary step P0 allows the advancement to the second step P2 where the control execution unit 27 changes the filter coefficient to establish a low-pass filter by using the digital filter 23 as shown in FIG. 4C. A low contrast can be determined by the fact that the maximum focus evaluation value obtained in the first operating mode is lower than a predetermined threshold, or a difference between the maximum and minimum focus evaluation values obtained in the first operating mode is below a predetermined threshold. The establishment of a low-pass filter accordingly serves to suppress the generation of a local extremum PK, as shown in FIG. 11, more than a high-pass filter when capturing an object of a low contrast. Therefore, a low-pass filter allows a more accurate detection of the maximum focusing evaluation value than a high-pass filter.

The control execution unit 27 sets in the third step P3 the interval between lens positions shorter than the interval in the first operating mode. The interval may depend on depth of field. Specifically, when depth of field is deep, for instance, with a wide lens with a narrow stop, an image can be focused relatively roughly since the movement of the focusing lens 10 does not largely affect an in-focus condition of the image. On the other hand, when depth of field is shallow, for instant, with a telephotographic lens with a wide stop, fine focus of the image is required. Depth of field is proportional to the square of focal length and inversely proportional to the degree of stop, so that the step width or the interval between lens positions is determined proportional to [(the square of focal length)/(the degree of stop)].

The control execution unit 27 moves at the third step P3 the focusing lens 10 to a lens position at boundary of the lens position range 35. The control execution unit 27 then begins searching the maximum focus evaluation value at the fifth step P5. The searching operation may be accomplished by calculating focus evaluation values at the predetermined intervals over the entire lens position range 35 and determining the maximum value out of all the calculated sample values. Alternatively the maximum value can be obtained by sequentially calculating focus evaluation values at the predetermined intervals and finding out a consecutive decrement in the focus evaluation value.

As described above, after a focusing lens 10 is moved once from the nearest point to the infinite point so as to first conduct a relatively rough focusing operation, a fine focusing operation can be conducted, so that it is possible to reliably prevent a local extremum from being erroneously taken for the maximum focus evaluation value.

In addition, the employment of a digital filter 23 allows various filters having different frequency characteristics by simply changing filter coefficient. As a result, a filter appropriate to an operating mode of the focusing apparatus 14 can immediately be established. Moreover, a step width of the focusing lens 10 can be determined based on the depth of field, thereby leading to an accurate and fast focusing operation.

What is claimed is:

1. An automatic focusing apparatus comprising:
a photoelectric detector capable of converting an image formed by a focusing lens into an electrical signal corresponding to an illuminance of the image; and
focusing means capable of calculating a focus evaluation value representative of an amount of high frequency component contained in the electrical signal and of focusing the image by moving the focusing lens in accordance with the focus evaluation value, wherein said focusing means comprising:
- a lens driver mechanism capable of moving said focusing lens over a full movement range from one of a nearest position and an infinite position;
- a detector driver capable of causing the photoelectric detector to output the electrical signal at stepwise lens positions during movement of the focusing lens over the full movement range,
- said focusing means specifying on the basis of the electrical signal from the photoelectric detector a lens position range including a lens position allowing a maximum value in the focus evaluation value;
- a digital filter capable of changing a pass band in response to a change of a filter coefficient;
- a controller capable of setting the filter coefficient, said controller setting the filter coefficient to establish a wide-pass filter by using the digital filter when the focusing lens moves over the full movement range from the nearest position or infinite position, and setting the filter coefficient to establish a high-pass filter by using the digital filter when the focusing lens moves within the lens position range following the movement over the full movement range; and
- step width determining means capable of changing in concert with a change of a filter coefficient an interval between lens positions such that a relatively wide step width is selected in concert with the wide-pass filter and a relatively narrow step range is selected in concert with the high pass filter.

2. An automatic focusing apparatus as defined in claim 1, wherein said controller sets the filter coefficient to establish a low-pass filter instead of said high-pass filter by using the digital filter upon detection of either the maximum value or a difference between the maximum and minimum values of the focusing evaluation value being smaller than a predetermined threshold during the movement of the focusing lens within the lens position range.

3. An automatic focusing device as defined in claim 1, wherein said focusing means further comprises:
- depth-of-field detecting means capable of detecting a depth of field at least in accordance with a focal length or a lens stop; and
- wherein said step width determining means is capable of changing in response to a detected depth of field an interval between lens positions within the lens position range.

4. A method of automatic focusing, comprising:
- forming an image on a photoelectric detector through a focusing lens so as to causing the photoelectric detector to output an electrical signal corresponding to an illuminance of the image;
- calculating a focus evaluation value representative of an amount of high frequency component contained in said electrical signal; and
- searching a lens position allowing a maximum value in said focus evaluation value so as to move said focusing lens to the lens position, wherein said method further comprising:
- setting a filter coefficient of a digital filter to establish a wide-pass filter when the focusing lens moves over a full movement range from the nearest position or infinite position, and setting the filter coefficient to establish a high-pass filter when the focusing lens moves over a lens position range within the full movement range;
- changing a stepwise interval between lens positions in concert with a change of filter coefficient;
- moving said focusing lens at least once over the full movement range from a nearest position or an infinite position so as to cause the photoelectric detector to output the electrical signal to the digital filter at stepwise lens positions during movement of said focusing lens over the full movement range;
- specifying on the basis of said electrical signal the lens position range including a lens position allowing the maximum value in said focus evaluation values; and
- searching the maximum value in said focus evaluation value within said lens position range.

5. A method of automatic focusing as defined in claim 4 further comprising the step of setting the filter coefficient to establish a low-pass filter instead of said high-pass filter upon detection of either the maximum value or a difference between the maximum and minimum values of the focusing evaluation value being smaller than a predetermined threshold during the movement of the focusing lens within the lens position range.

6. An automatic focusing apparatus comprising:
- a photoelectric detector capable of converting an image formed by a focusing lens into an electrical signal corresponding to an illuminance of the image; and
- focusing means capable of calculating a focus evaluation value representative of an amount of high frequency component contained in the electrical signal and of focusing the image by moving the focusing lens in accordance with the focus evaluation value, wherein said focusing means comprising:
- a lens driver mechanism capable of moving said focusing lens over a full movement range from one of a nearest position and an infinite position;
- a detector driver capable of causing the photoelectric detector to output the electrical signal at stepwise lens positions during movement of the focusing lens over the full movement range,
- said focusing means specifying on the basis of the electrical signal from the photoelectric detector a lens position range including a lens position allowing a maximum value in the focus evaluation value;
- a digital filter capable of changing a pass band in response to a change of a filter coefficient;
- a controller capable of setting the filter coefficient, said controller setting the filter coefficient to establish a wide-pass filter by using the digital filter when the focusing lens moves over the full movement range from the nearest position or infinite position, and setting the filter coefficient to establish a high-pass filter by using the digital filter when the focusing lens moves within the lens position range following the movement over the full movement range; and
- wherein said controller sets the filter coefficient to establish a low-pass filter instead of said high-pass filter by using the digital filter upon detection of either the maximum value or a difference between the maximum and minimum values of the focusing evaluation value being smaller than a predetermined threshold during the movement of the focusing lens within the lens position range.

* * * * *